July 16, 1963

I. H. LEACH ETAL 3,097,397

PLASTIC MOLD

Filed Nov. 22, 1960

INVENTOR.
Irby H. Leach
BY Frank H. Bickford

Townsend and Townsend
Attorneys

INVENTOR.
Irby H. Leach
BY Frank H. Bickford
Townsend and Townsend
attorneys

July 16, 1963
I. H. LEACH ETAL
3,097,397
PLASTIC MOLD
Filed Nov. 22, 1960
4 Sheets-Sheet 3
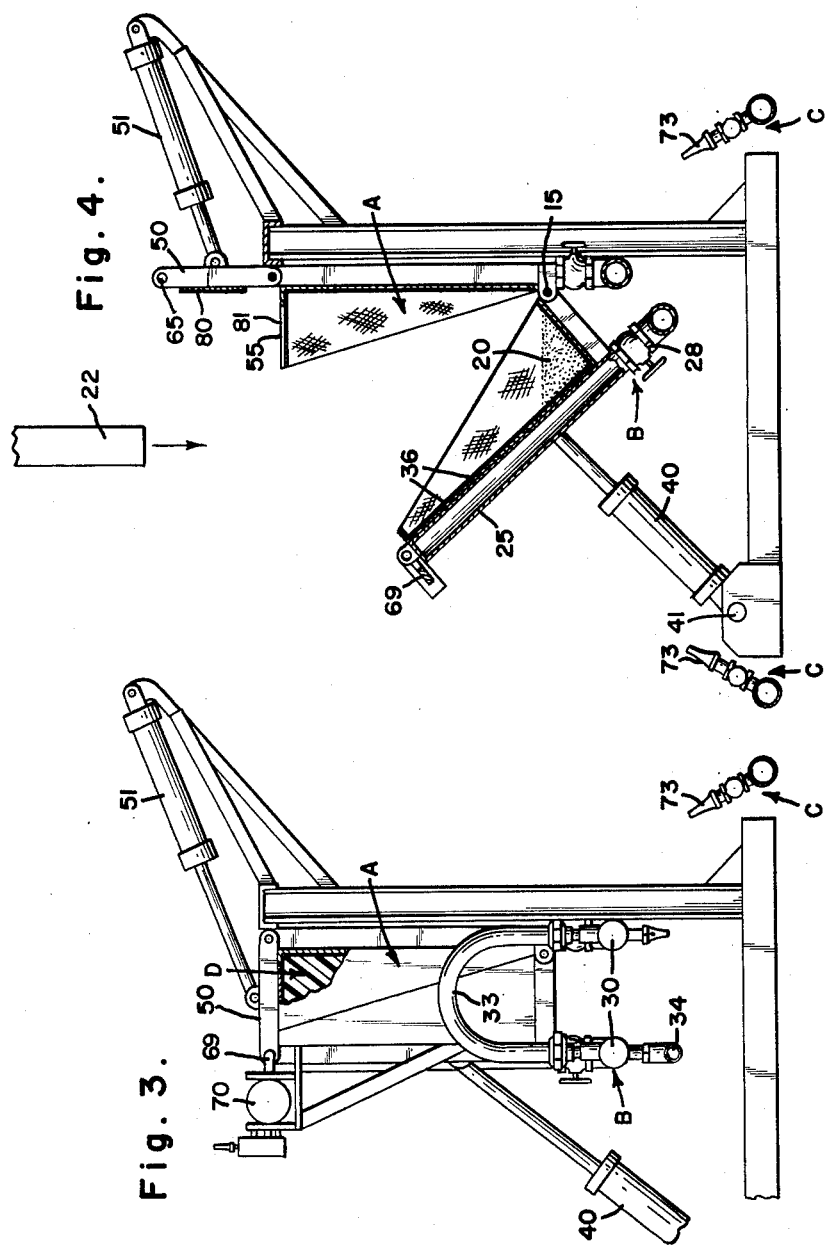
INVENTOR.
Irby H. Leach
BY Frank H. Bickford
Townsend and Townsend
Attorneys July 16, 1963 I. H. LEACH ETAL 3,097,397
PLASTIC MOLD
Filed Nov. 22, 1960 4 Sheets-Sheet 4
Fig. 5.
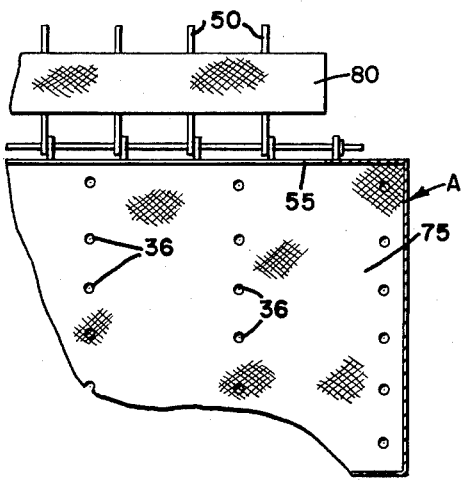
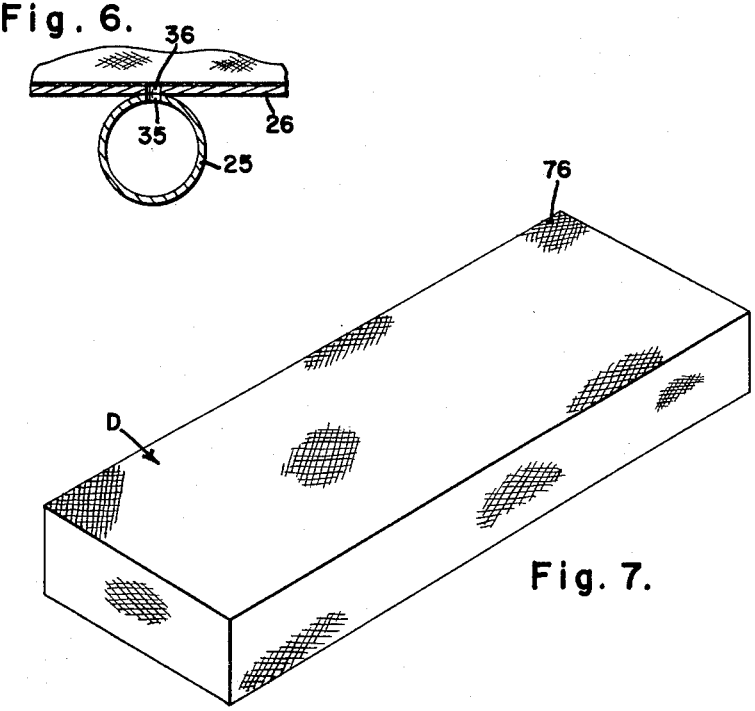
Fig. 7.
INVENTOR.
Irby H. Leach
BY Frank H. Bickford 3,097,397
PLASTIC MOLD
Irby H. Leach and Frank H. Bickford, both of
603 Brown St., Napa, Calif.
Filed Nov. 22, 1960, Ser. No. 70,996
5 Claims. (Cl. 18—38)

This invention relates to a plastic mold for molding expandable plastic material such as polystyrene.

In the art of molding expandable plastics such as polystyrene small pellets of material are placed within a mold cavity. The material within the cavity is then elevated in temperature to a sufficient degree to cause the pellets to expand many times their initial size thus causing the material to expand under pressure to completely fill the mold area. The end product is a highly compressed integrated object formed of mechanically united bubbles.

The technique of molding such products is such that the product can be made of relatively high or relatively low density depending upon the relative percentage of particles to the mold size. In the case of high density products, the plastic material exerts a great amount of force against the mold surface so that it is necessary that the mold itself be sufficiently rigid to withstand the internal pressures. Furthermore, it is also necessary to heat the material in order to obtain expansion. This is conventionally done by one means or another by injecting steam into the mold cavity. The hot steam when acting against the expandable product, raises the temperature of the plastic to obtain the requisite expansion of the material.

In the prior art several types of devices have been conventionally used, the most common of which is to provide a mold cavity surrounded by an external manifold. Steam is injected into the manifold in such a way that the steam in the manifold is allowed to pass through apertures between the manifold and the interior of the mold.

It has been found desirable to cool the expanded product as rapidly as possible after it has reached its requisite expansion. This is done in the prior art devices by withdrawing the steam from the manifold and then injecting cold water or cold air into the manifold.

Another common method of molding such plastic material is called a steam injection system in which probes are injected into the mold area through which steam is injected therein. After expansion the probes are then removed.

The principal object of this invention is to provide a unique mold for expandable plastic material in which steam is provided through apertures in the mold wall through external pipes which have a minimal contact with the outer wall of the mold and to subsequently cool the mold by spraying cold water on the outer face of the mold.

A feature and advantage of this invention is that the cold water is allowed to reach almost all of the external surface of the mold face due to the fact that the pipes carrying the steam have only a minimal contact with the outside face of the mold. This is a material advantage over the manifold type mold in that it eliminates the requirement for withdrawing the steam from the manifold and then injecting cold water. Thus by this device the mold can be made for considerably less cost and provides a much more rapid cooling than would be obtainable in the other types of molds.

Another object of this invention is to provide a mold chest in which a plurality of pipes are arranged adjacent the outer face of the mold with a steam passageway extending from the pipes into the interior of the mold so that steam can be passed through the pipes and into the mold material and with the further provision of a cold water spray which may be sprayed directly on the exterior of the mold to effect rapid cooling after the termination of the steam portion of the operational steps.

Another feature and advantage of this construction is in the provision of establishing a separate valve for each of the steam pipes so that the steam flow through each of the pipes is independently controllable. This is an important feature of the invention in that it allows the steam pressure into each portion of the mold to be substantially equalized. This feature allows a more equalized injection of steam into the mold cavity so that all portions of the cavity receive substantially the same steam flow. This results in more uniform expansion of the expandable plastic due to the fact that the expandable plastic is subjected throughout the entire mold interior to a constant temperature gradient. The end product is thus more uniform in density and in other physical characteristics.

As a further feature and advantage of this invention the various pipes supplying the mold can be formed of different diameters to also compensate to equalize the steam flow into the interior of the mold cavity.

As another object of this invention the mold cavity is lined with a Fiberglas cloth lining.

The lining has the feature and advantage of absorbing much of the condensed water that results from the steam within the mold and in addition imparts a uniform texture to the outer face of the skin of the end molded product.

A further feature and advantage of this invention is that in the fabrication of substantially large molded products other molds tend to create end products which tend to bow into a concavo-convex configuration while in the present invention the combination of the uniform steam injection or the more rapid cooling results in an end product which does not exhibit the aforesaid concavo-convex distortion.

The objects of the present invention can be realized by mounting the steam pipes tangentially to the outer face of the mold with the provision of apertures extending through the steam pipes and wall for injection of steam from the pipes into the mold cavity. In such a structure the steam pipes maintain a minimal contact with the mold face so that the cool water can contact the greater portion of the mold wall to effect more rapid and quick cooling. It has been found that the more rapid and effective cooling obtained through the apparatus of this invention results in an end product having a harder skin face than products made by existing mold configurations.

A further object of this invention is to provide ribs extending between the various steam pipes which have the dual function of providing stiffeners for the mold face and having the additional function of acting as cooling fins which increase the effective heat radiation area of the outer face of the mold. The vertically spaced braces on the outer face of the mold also function as locking means by which the mold can be locked in its closed position.

Other objects of the present invention will become apparent upon reading the following specification and referring to the accompanying drawings in which similar characters of reference represent corresponding parts in each of the several views.

In the drawings:
FIG. 1 is a side elevational view showing the principal embodiment of the mold of this invention.
FIG. 2 is a top plan view of FIG. 1.
FIG. 3 is a side elevational view of FIG. 1.
FIG. 4 is a cross-sectional view showing the mold in an open condition of operation.
FIG. 5 is a fragmentary enlarged view showing the interior face of the side wall of the mold.

FIG. 6 is a cross-sectional view of one of the pipes and a fragmentary portion of the side wall of the mold particularly showing the aperture opening between the pipe and the interior of the mold.

FIG. 7 is a perspective view showing the end product formed by the mold configuration of the principal embodiment of this invention.

Figure 1:
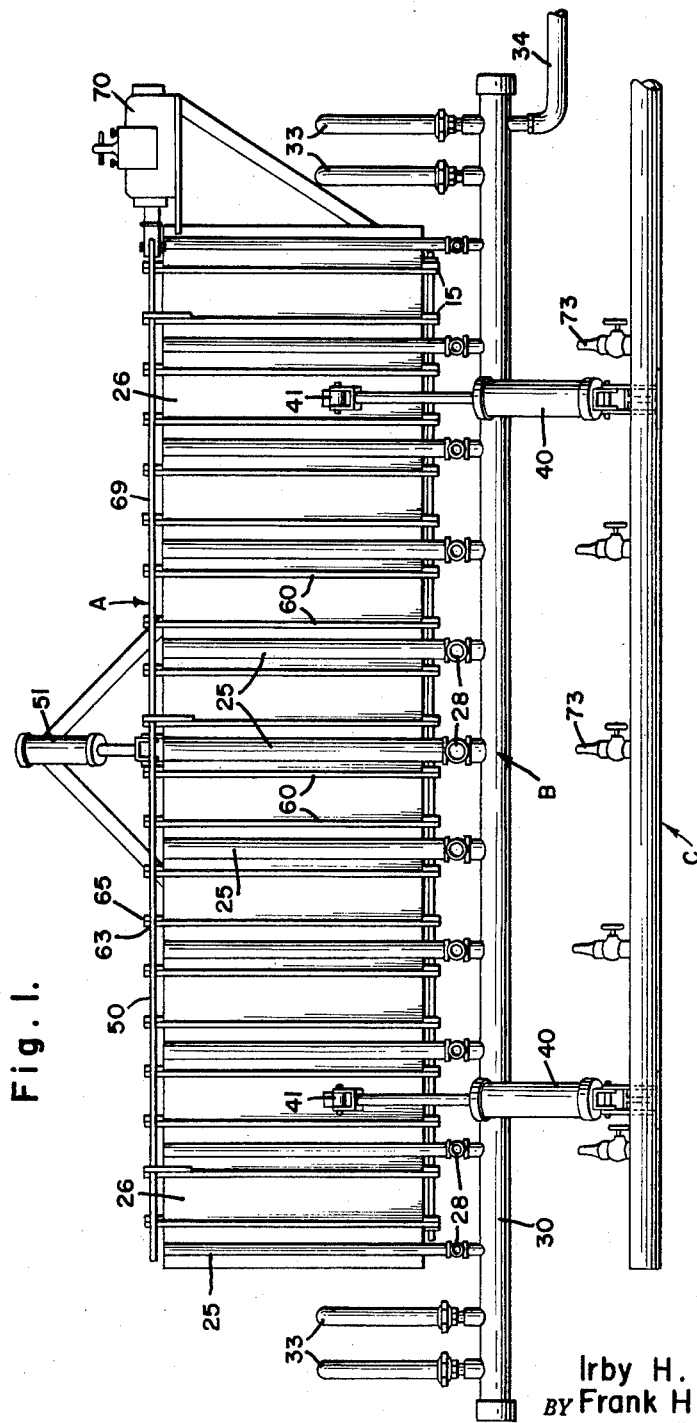
Figure 2:
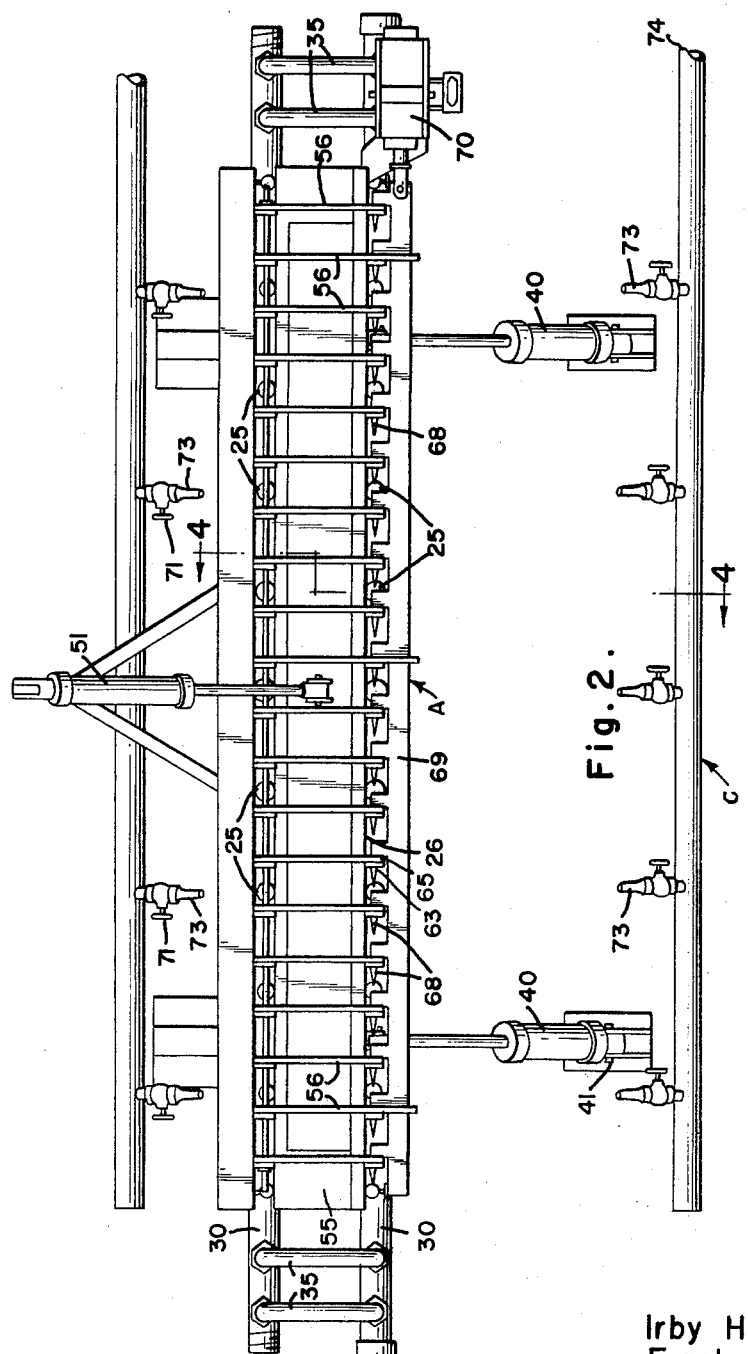

The mold of the principal embodiment of this invention generally comprises a vertical mold chest generally indicated at A formed in two parts and hinged at the bottom at 15 so as to be movable from an open position, as indicated in FIG. 4, to a closed position, as indicated in FIG. 3.

Pellets of expandable plastic such as polystyrene, as indicated at 20, are fed into chest A while it is in the open position from a plastic dispensing nozzle 22. Mold chest A is then closed as shown in FIG. 3.

The outer face of both sides of mold chest A is provided with a pipe assembly B which is arranged to inject steam into chest A to cause the internal temperature of the chest to rise and expandable plastic 20 to expand to completely fill the chest area.

After expansion a water spray assembly C is arranged to spray water on the outer face of mold chest A to cause rapid cooling. Thereafter the chest is moved to its open position, as shown in FIG. 4, and a molded product D, as shown in FIG. 7, is withdrawn from the chest. The particular product, as shown in FIG. 7 in this device, may be approximately the size of a single bed mattress and has practical applications for use as floats and the like due to the fact that such molded products have extremely low density and have sufficient rigidity to be used for this purpose.

The steam assembly is identical on both sides of the chest and generally comprises a plurality of vertical parallel spaced apart pipes 25 mounted tangentially on the outer wall face 26 of mold chest A.

Each of the pipes 25 connect through a valve 28 to a main steam pipe 30. The two pipes 30 on opposite sides of the chest are joined by flexible hoses 33. Hoses 33 are flexible to allow the chest to be moved between its open and closed positions. Steam is fed into pipes 30 from any convenient location such as indicated at 34.

Pipes 25 form a series of apertures 35 which are mated with complementary apertures 36 in outer face 26 so that steam within pipes 25 can pass into the mold cavity.

The mechanism for opening and closing the mold comprises a pair of pneumatic motors 40 which are connected pivotally at 41 to outer face 26 in such a way that motors 40 will open and close the mold.

The mold is locked in its closed position by a rocker arm assembly 50 operated by a motor 51. When the mold is in the open position rocker arm assembly 50 is in the upper position and when the mold is in the closed position motor 40 pivots the rocker arm downwardly over the top face 55 of mold chest A.

Rocker arm assembly 50 carries a plurality of arms 56 each forming an aperture extending slightly beyond outer face 26 of the mold. The mold face is further provided with a plurality of vertically spaced apart parallel ribs 60 extending the entire height of mold face 26 to a position above top face 55 of the mold so that the upper portion 63 of each rib is juxtaposed a similar face 65 of each of the arms 56. Arms 56 and ribs 60 are apertured at their mating sections 63 and 65 respectively to receive locking pins 68 which are carried by a locking pin carrying arm 69 operated by a solenoid 70.

Water spray assembly C merely comprises a plurality of spray nozzles which may incorporate the simple garden hose spray type outlet as indicated at 73 and which may be actuated by a suitable valve such as indicated at 74. The interior or cavity of chest A is lined with a Fiberglas mat material as indicated in FIG. 5 at 75. The Fiberglas mat material tends to absorb the moisture in the mold proper and forms the outer face, as seen at 76, in the end product D.

In operation mold chest A is moved to its open position by appropriately energizing motors 40. Pellets of expandable plastic, such as polystyrene, are injected in requisite quantities from dispenser 22. Thereafter motors 40 are energized to close mold chest A and motor 51 is energized to cause rocker arm assembly 50 to move downwardly to align the apertures in the terminal ends 63 and 65 of ribs 60 and rocker arm assembly 50 respectively.

Alternatively a cap 80 may be mounted on the underside of arms 56 in such a manner as to overlie an aperture 81 on the top portion of the mold. In this way the mold may be filled while in the closed position and the cap 80 can be tightly held in place by virtue of the inner action and locked relationship between arms 56 and ribs 60.

Locking pin carrying arm 69 is actuated by solenoid 70 to cause pins 68 to enter both of the apertures in each pair of mating ribs and arms to securely lock the mold in closed position. The mold faces must be rigidly supported and the mold must be tightly held in locked position in order to withstand the internal pressures that are created within the mold interior. Steam is then fed through pipes 34 and into pipes 30 and thereafter into the respective pipes 25. The steam through pipes 25 enters the mold cavity and heats expandable plastic 20 to obtain its expansion temperature gradient.

Valves 28 provide an adjustable feature of the machine by which the steam pressure or flow in each of the pipes 25 can be independently adjusted. Because of this individual adjustment feature any irregularity of steam flow, aperture size or pipe size can be compensated for. Each pipe can therefore be adjustable to deliver an equal amount of steam flow. This completely equalizes the steam flow into the interior of the chest with the end result of a more uniform and usable product.

It can be seen that the steam flow can also be adjusted by varying the size of the pipes 25. For example the center pipes may be larger in diameter than the outside pipes in order to help equalize the steam pressure or flow into the interior of the chamber. In any event the valves assist materially in providing the precise control highly desirable in this type of device. Steam is then cut off through line 34.

After expandable plastic 20 has expanded to its termination, water spray assembly C is actuated by valve 74 which causes water to flow through nozzles 73 to cause a rapid cooling of the entire mold.

Because pipes 25 have only a tangential contact with face 26 the water is able to act against almost the entire face of the mold. This causes an extremely rapid cooling action. It is not necesasry that the pipes be mounted tangentially in that as an alternative it is believed obvious that the pipes may be spaced from outer face 26 of the mold with a small fluid communication line interconnecting the pipes and the face. However, mounting the pipes on the face provides an additional advantage of adding a stiffening or bracing function as well as supply the steam release for the mold.

Ribs 60 function as cooling fins during the water spray time in that the fins increase the effective radiation area of outer face 26 of mold A.

After the mold has cooled to its requisite point solenoid 70 is actuated to control pins 68 from engagement with their respective arms and apertures. Motor 51 is actuated to move rocker arm assembly 50 upwardly and motors 40 are moved to open the mold. End product D is then manually removed from the mold and the process is repeated.

It is noted that the Fiberglas mating provides the important feature of absorbing much of the moisture created by the flow of steam into the mold area and in addition helps in forming a hard, rigid and controllable texture on outer face 76 of molded product D.

Although the foregoing invention has been described in some detail by way of illustration and example for purposes of clarity of understanding, it is understood that certain changes and modifications may be practiced within the spirit of the invention as limited only by the scope of the appended claims.

What is claimed:

1. A mold for forming articles from expandable plastic particles comprising: a chest formed of walls of sheet material, the inner wall surface being in direct contact with the expandable plastic particles, said chest being imperforate except for spaced apertures formed within the wall thereof, a plurality of spaced pipes positioned adjacent the outer surface of said apertured wall allowing a maximum outer wall surface area to be exposed directly to the atmosphere, aligned, openings formed in each of said pipes, means for providing fluid communication between the said openings formed by side pipes and the apertures formed by said wall, means for injecting steam under pressure into said pipes for even distribution to said chest, and means for cooling said exposed outer wall surfaces whereby said chest is subjected to even heat distribution as a result of equalized steam flow through said spaced pipes and to instantaneous cooling by said cooling means contacting the relatively large exposed outer wall surfaces between said spaced pipes.

2. The apparatus as claimed in claim 1 wherein said cooling means comprises a spray of water directed against said outer wall of said chest.

3. The apparatus as claimed in claim 1 wherein the inner surface of said chest is formed with a covering of mat material.

4. The apparatus as claimed in claim 1 wherein the inner surface of said walls is formed with a covering of Fiberglas mat material which absorbs the moisture from the condensed steam and imparts a texture to the surface of the expanded plastic.

5. The apparatus as claimed in claim 1 wherein said pipes are mounted tangentially against the outer wall surface of said chest to provide structural support for said wall with minimum obstruction to the cooling water spray.

References Cited in the file of this patent

UNITED STATES PATENTS

| | | |
|---|---|---|
| 619,810 | Upham | Feb. 21, 1899 |
| 2,537,977 | Dulmage | Jan. 16, 1951 |
| 2,707,801 | Gard | May 10, 1955 |
| 2,948,926 | Kuhn | Aug. 16, 1960 |

OTHER REFERENCES

Koppers Bulletins, C-9-273, "Mold Filling," Chapt. 3d, pages 1-3, and "Mold Techniques and Mold Design," Chapt. 3e, pages 15, 16 and 19, both Nov. 15, 1959.